United States Patent [19]

Delnick et al.

[11] Patent Number: 4,508,796

[45] Date of Patent: Apr. 2, 1985

[54] CHROMIUM (V) COMPOUNDS AS CATHODE MATERIAL IN ELECTROCHEMICAL POWER SOURCES

[75] Inventors: Frank M. Delnick; Ronald A. Guidotti; David K. McCarthy, all of Albuquerque, N. Mex.

[73] Assignee: The United States of America as represented by the United States Department of Energy, Washington, D.C.

[21] Appl. No.: 487,492

[22] Filed: Apr. 21, 1983

[51] Int. Cl.$^3$ ............................................. H01M 6/20
[52] U.S. Cl. ..................................... 429/112; 429/218
[58] Field of Search ................................ 429/112, 218

[56] References Cited

U.S. PATENT DOCUMENTS 4,158,722 6/1979 Lauck et al. ........................ 429/194
4,260,667 4/1981 Miles et al. ........................ 429/112
4,416,958 11/1983 Miles et al. ........................ 429/112

OTHER PUBLICATIONS

Besenhard et al., Chromium Oxide as Cathodes For Secondary High Energy Density Lithium Batteries, J. Electrochemical Soc. 124, p. 968, Jul. 1977.

*Primary Examiner*—Donald L. Walton
*Attorney, Agent, or Firm*—Armand McMillan; Albert Sopp; Judson R. Hightower

[57] ABSTRACT

A cathode for use in a thermal battery, comprising a chromium (V) compound. The preferred materials for this use are $Ca_5(CrO_4)_3Cl$, $Ca_5(CrO_4)_3OH$, and $Cr_2O_5$. The chromium (V) compound can be employed as a cathode material in ambient temperature batteries when blended with a suitably conductive filler, preferably carbon black.

7 Claims, No Drawings

CHROMIUM (V) COMPOUNDS AS CATHODE MATERIAL IN ELECTROCHEMICAL POWER SOURCES

The U.S. Government has rights in this invention pursuant to Contract No. DE-AC04-76DP00789 between the U.S. Department of Energy and Western Electric Company.

BACKGROUND OF THE INVENTION

This invention relates to thermal batteries employing cathodes comprising a major amount of a chromium (V) compound as cathode active material. In another aspect, the invention relates to a cathode for use in a thermal battery. In still another aspect, the invention relates to the use of chromium (V) compounds as cathode materials in ambient temperature batteries. (NOTE: In discussions of battery technology, the terms cathode, depolarized cathode, ad depolarizer are frequently used. Hereinafter, only the term "cathode" will be used, and will be understood to embrace the meanings carried by any of these terms.)

Thermal batteries are generally described as batteries which have an electrolyte comprising a salt mixture, (i.e., LiCl/KCl eutectic), which is solid at ambient temperatures, and nonconductive to ions. When fused, the salt mixture becomes fluid and ionically conductive. The development of thermal battery technology and details thereof are discussed in more detail in a report published by The American Society of Mechanical Engineers, entitled *A Review of Thermal Battery Technology* by B. H. Van Domelen and R. D. Wehrle, reprinted from the 9th Intersociety Energy Conversion Engineering Conference, and incorporated by reference herein. More recent developments in thermal battery technology, although directed to a different aspect than the present invention are disclosed in related U.S. Patent Application Ser. No. 361,151, filed Mar. 23, 1982 by James R. Armijo et al., now U.S. Pat. No. 4,383,014 the disclosure therein being incorporated by reference herein.

The disclosure of said patent application relates to an improvement in thermal battery technology wherein an $FeS_2$ cathode includes an additive for stabilization purposes. However, although an improvement over the prior art, $FeS_2$ cathodes, including those of the above-discussed application, have a number of disadvantages. For instance, although exhibiting longer life and greater voltage stability than prior art $CaCrO_4$ cells, $FeS_2$ cells require a separator pellet or layer between the cathode and the anode resulting in a complicated construction. In addition, the $FeS_2$ cathode has a limited range or maximum temperature limit because it thermally decomposes in LiCl/KCl eutectic at approximately 550° C.

*The Journal of the Electrochemical Society* discloses in Vol. 124, page 968, (1977), in an article by J. R. Besenhart et al, that some testing has been done with chromium oxides as cathodes for secondary high energy density lithium batteries. However, there is no discussion or appreciation therein of the use of the specific Cr(V) compounds applied to both thermal batteries and ambient temperature batteries as cathodes in accordance with the present invention.

The common cathode materials known to the inventors to be used in thermal batteries are $CaCrO_4$, $V_2O_5$ and $FeS_2$. Of these, $CaCrO_4$ and $V_2O_5$ are soluble in molten LiCl/KCl eutectic. Therefore, a portion of the active cathode material must be expended in the formation of a separator layer to prevent self discharge. Cathodes of these materials are also subject to concentration polarization in the course of discharge.

$FeS_2$ is insoluble in LiCl/KCl eutectic, hence avoiding the two difficulties mentioned above. $FeS_2$, however, possesses limited thermal stability, undergoing thermal decomposition in LiCl/KCl eutectic at approximately 550° C.

Like $FeS_2$, the chromium (V) compounds, subject of this disclosure, are insoluble in molten LiCl/KCl eutectic, avoiding the necessity of separator formation and concentration polarization. Unlike $FeS_2$, these compounds are not subject to decomposition in LiCl/KCl to at least 600° C.

SUMMARY OF THE INVENTION

It is an object of the present invention to provide an improved thermal battery, having a cathode insoluble in LiCl/KCl eutectic, or other suitable molten salt, of greater thermal stability than $FeS_2$.

Another object of the present invention is to provide a cathode suitable for use in batteries operative at ambient temperatures.

Upon study of the specification and appended claims, further objects and advantages of this invention will become apparent to those skilled in the art.

In accordance with the invention, an improved thermal battery containing a number of single cells, each comprised of a heat pellet, an intercell connector, an anode pellet, a separator, and a cathode pellet is provided wherein the cathode is primarily composed of a chromium (V) compound. Specifically, the chromium (V) compounds referred to contain, in addition to chromium in the plus five oxidation stage, oxygen, sometimes chlorine, and generally alkaline earth metals.

In accordance with another aspect, the invention comprises a cathode useful in a thermal battery, the cathode being primarily composed of a chromium (V) compound, as discussed above.

In yet another aspect, the invention comprises an improved cathode for use in conventional room or ambient temperature batteries. The cathode is made of one of the above-stipulated chromium (V) compounds blended with a conductive filler, appropriate for use as a cathode material, and a binder. In a preferred aspect, the conductive filler is carbon black. The cell is conventional as generally described in *The Journal of Electroanalytical Chemistry*, Vol. 72, (1976), pages 1–31, incorporated by reference herein.

As presently discussed, a number of chromium (V) compounds can be employed in the cathodes in accordance with the invention. They are generally chromium (V) oxygen containing compounds, and alkaline earth metal salts such as the Ca and Ba chromium (V) compounds. Known specific compounds are $Ca_5(CrO_4)_3Cl$, $Ca_2CrO_4Cl$, $Ca_5(CrO_4)_3OH$, $Ca_3(CrO_4)_2$, and $Cr_2O_5$, with $Ca_5(CrO_4)_3Cl$, $Ca_5(CrO_4)_3OH$ and $Cr_2O_5$ being the most preferred for use with an electrolyte of LiCl/KCl eutectic. Other compounds containing Cr(V) may be more suitable for use with other molten salts. Such a selection might easily be made by one skilled in the art.

The preparation of these compounds is discussed in *The Journal of Inorganic Chemistry*, Vol. 4, page 78 et seq., (1965), which is incorporated by reference herein.

When employed in thermal batteries, the cathode will consist of about 70–90% by weight chromium (V) compound and about 10–30% by weight LiCl/KCl eutectic which is conventional in nature.

The LiCl/KCl serves as wetting agent and as a binder, aiding pellet formation and improving the mechanical strength of the pellets. Alternatively, an electrolyte-binder mix may be used in place of the electrolyte alone, provided the binder is unreactive with the Cr(V) compound. Magnesium oxide is such a binder. It is also possible to prepare pellets of pure Cr(V) compounds with sufficient mechanical integrity to allow testing in single cells, as will be subsequently described.

When chromium (V) compounds are employed in cathodes of ambient temperature batteries, the percentage by weight of the chromium (V) compound, filler and binder selection is conventional. Typically the cathode will comprise 5–25% binder, 5–30% conductive filler, with the remainder chromium (V) compound. The filler is a material possessing good ambient temperature electrical conductivity. Carbon black is the preferred filler, but possible fillers are copper, nickel, graphite, and others which will be apparent to those skilled in the art. Selection of binder and conductive filler for cathodes incorporating compounds containing reducible moieties other than Cr(V) is disclosed in *The Journal of the Electrochemical Society*, Vol. 120, pp. 1214 et seq., (1974); all incorporated by reference herein.

As in thermal batteries, the most preferred compounds for use are $Ca_5(CrO_4)_3OH$, $Ca_5(CrO_4)_3Cl$ and $Cr_2O_5$.

DETAILED DISCUSSION OF THE INVENTION

For thermal battery applications, wherein a cathode pellet is comprised of an active material, a molten salt electrolyte and a binder, the invention comprises the use of a chromium (V) compound as the active cathode material. As discussed previously, these chromium (V) compounds generally contain oxygen, usually chlorine, and alkaline earth metal such as Ca and Ba. Preferred chromium (V) compounds for this use are $Ca_5(CrO_4)_3Cl$, $Ca_2CrO_4Cl$, $Ca_5(CrO_4)_3OH$, $Ca_3(CrO_4)_2$ and $Cr_2O_5$, with the most preferred being $Ca_5(CrO_4)_3OH$, $Ca_5(CrO_4)_3Cl$ and $Cr_2O_5$.

In accordance with the invention, the cathode of the battery is typically a two gram pellet of the chromium (V) compound. LiCl/KCl eutectic is sometimes added as a wetting agent and pelletizing aid. Anodes may be calcium, calcium alloy, lithium or lithium alloy or other oxydizable material. Separator pellets are LiCl/KCl eutectic with MgO binder. In practical applications the chromium (V) compound comprises 70–90% of the mass of the cathode pellet, the remainder being, as aforesaid, electrolyte or electrolyte-binder mix. Binders other than MgO known to those skilled in the art will function effectively. The selection of the binder material and method of assembly of materials is conventional as is discussed in *High Energy Density Li Cells, Pt. II, Cathodes and Complete Cells* by G. Eichinger and J. O. Besenhard, J. Electrochem Soc. 124, 968 et. seq.

When the chromium (V) compounds are to be employed in ambient temperature batteries, an electrically conductive filler must be blended with the chromium (V) compound. Suitably conductive fillers include, carbon black, graphite, metal powders or the like. A binder such as Teflon ® is also added. Other suitable binders include polyethylene, polypropylene, or equivalent polymers. In this type of battery, the conductive filler typically comprises 5–30% by weight of the cathode, the binder is typically 5–25% by weight, with the remainder being the chromium (V) compound. The filler may be a combination of fillers and the binder, a combination of binders, as will be evident to those skilled in the art.

The electrolyte used in the ambient temperature battery is propylene carbonate saturated with $LiAsF_6$. The anode is pure lithium. The selection of the electrolyte and anode is conventional, and other materials can be substituted therefor as will be obvious to those skilled in the art. Such ambient temperature batteries are described in detail as noted previously, in, e.g., *The Journal of Electroanalytical Chemistry*, Vol. 72, (1976), pages 1–31, which has been incorporated by reference herein.

In both the thermal batteries and the ambient temperature batteries, the cathode is made from finally divided chromium (V) compounds. $Cr_2O_5$ may be prepared by the method set forth in J.A.C.S. 74, (1952), P1676 by R. S. Schwartz, I. Fankuchen and R. Ward. $Ca_5(CrO_4)_3Cl$, $Ca_5(CrO_4)_3OH$, and $Ca_2CrO_4Cl$ may be obtained by the methods of R. Scholder and W. Klemm. Angem. Chem. 66, 461 (1954); R. Scholder and H. Suchy. Z. Anorg. Allgem. Chem. 308 295 (1961); R. Scholder and H. Schwarz, ibid., 326, 11 (1963); E. Banks and K. L. Jaunarajs, Inorg. Chem. 4, 78 (1965); R. Scholder, F. Schwochow, and H. Schwarz ibid., 363, 10, (1968); E. Banks, M. Greenblatt, and B. R. McGarvey, J. Sol. St. Chem. 3, 308 (1971); each incorporated by reference herein. The powder is generally compacted with or without other materials as discussed in the above cited Eichinger and Basenhard article into the shape or structure making up the cathode.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A cell was constructed employing a 2-gram pellet of $Ca_5(CrO_4)_3Cl$ as the cathode, LiCl/KCl eutectic with a binder as the electrolyte, and a Ca-stainless steel bimetal as the anode. The cathode composition was substantially pure $Ca_5(CrO_4)_3Cl$. The cell was heated to 500° C. under argon and discharged through a resistive load of 7.9 ohms. At approximately 90 second intervals, the resistive load was decreased to 0.89 ohms for 5 seconds. For 25 minutes, the cell voltage remained above 2 volts while under the 7.9 ohm load.

EXAMPLE 2

A cell was reconstructed employing a 2-gram pellet of $Ca_5(CrO_4)_3OH$ as the cathode. LiCl/KCl eutectic with a binder acted as the electrolyte, and Li-Si alloy, as the anode. The cathode composition was substantially pure $Ca_5(CrO_4)_3OH$. The cell was heated to 500° C. under argon and discharged at a current density of 32 mA/cm$^2$. At approximately 90-second intervals, the current density was increased to 126 mA/cm$^2$ for 5 seconds. For 61 minutes the cell voltage remained above 2 volts while discharging at 32 mA/cm$^2$.

EXAMPLE 3

A cell was constructed employing a 2-gram pellet of $Ca_5(CrO_3)_3OH$ as the cathode, LiCl/KCl eutectic with a binder as the electrolyte, and stainless steel metal felt saturated with $CaLi_2$ alloy as the anode. The cathode composition was substantially pure $Ca_5(CrO_4)_3OH$. The cell was heated to 500° C. under argon and discharged at a current density of 32 mA/cm². At approximately 90-second intervals, the current density was increased to 126 mA/cm² for 5 seconds. For 73 minutes, the cell voltage remained above 2 volts while the cell was discharged at 32 mA/cm².

EXAMPLE 4

A cell was constructed employing a 2-gram pellet of $Cr_2O_5$ as the cathode. LiCl/KCl eutectic with a binder acted as the electrolyte, and Li-Si alloy was the anode. The depolarizer composition was substantially pure $Cr_2O_5$. The cell was heated to 500° C. under argon and discharged at a current density of 32 mA/cm². At 55 second intervals the current density was increased to 126 mA/cm² for 5 seconds. For 23 minutes the cell voltage remained above 2 volts while discharged at 32 mA/cm².

In another example, while nonconductive at room temperature, the Cr(V) compounds can serve as cathodes in ambient temperature batteries when blended with a suitably conductive filler, for example, carbon black.

EXAMPLE 5

A cell was constructed employing a cathode plaque consisting of 66.7% $Ca_5(CrO_4)_3OH$, 26.6% carbon black, and 6.7% Teflon ® filler. Propylene carbonate saturated with $LiAsF_6$ acted as the electrolyte, and the anode was pure Li. An open circuit voltage of 2.6 volts was obtained. When the cell was discharged at a current density of 0.5 mA/cm², a nominal voltage of 2.2 volts was observed; when discharged at a current density of 3 mA/cm², a nominal voltage of 1.30 volts was observed.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a thermal battery having a plurality of single cell pellets arranged in a stack, with each single cell comprising a heat pellet and two current collectors, an anode pellet, a separator pellet, and a cathode pellet, the improvement wherein said cathode material comprises a system compatible chromium (V) compound.

2. A thermal battery according to claim 1, wherein said chromium (V) compound is $Ca_5(CrO_4)_3Cl$, $Ca_2CrO_4Cl$, $Ca_5(CrO_4)_3OH$, $Ca_3(CrO_4)_2$ or $Cr_2O_5$.

3. A thermal battery according to claim 1, wherein said cathode portion further coprises a LiCl/KCl eutectic as binder and wetting agent.

4. A thermal battery according to claim 1, wherein said cathode portion consists of substantially pure chromium (V) compound.

5. A thermal battery according to claim 3, wherein the amount of said LiCl/KCl eutectic is about 10–30% by weight of the cathode and the amount of chromium (V) compound is about 70–90% by weight.

6. A thermal battery according to claim 1, wherein said chromium (V) compound is an oxygen-containing chromium (V) compound.

7. A thermal battery according to claim 1, wherein said chromium (V) compound is an alkaline earth metal salt.

* * * * *